Nov. 28, 1939.                H. A. BEEKHUIS, JR                2,181,559
                        PROCESS FOR PRODUCING A NITRATE
                              Filed May 18, 1937
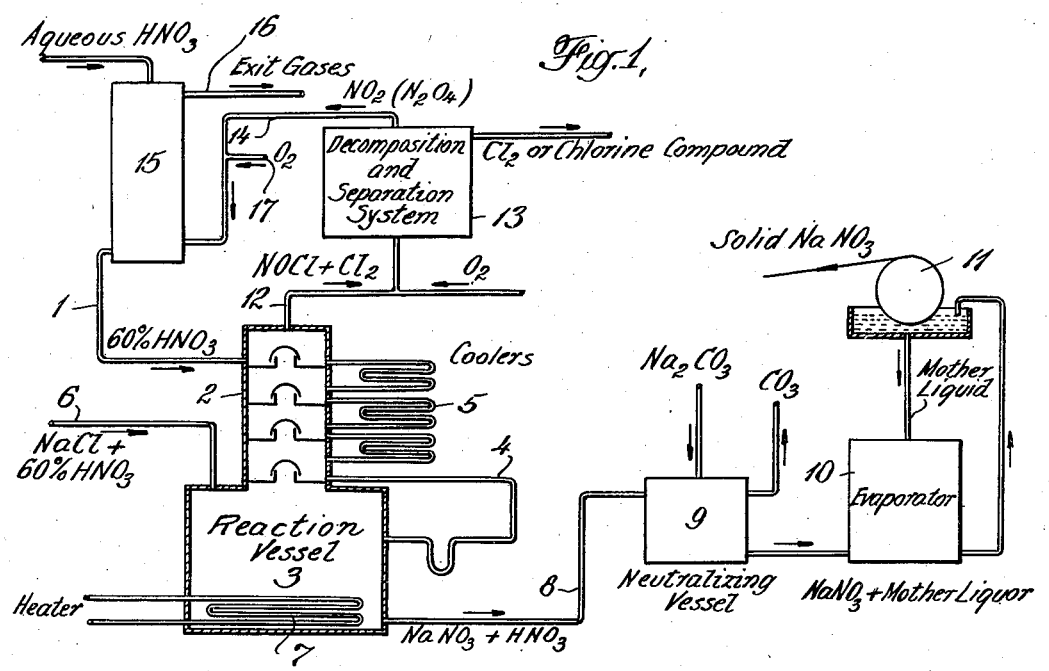
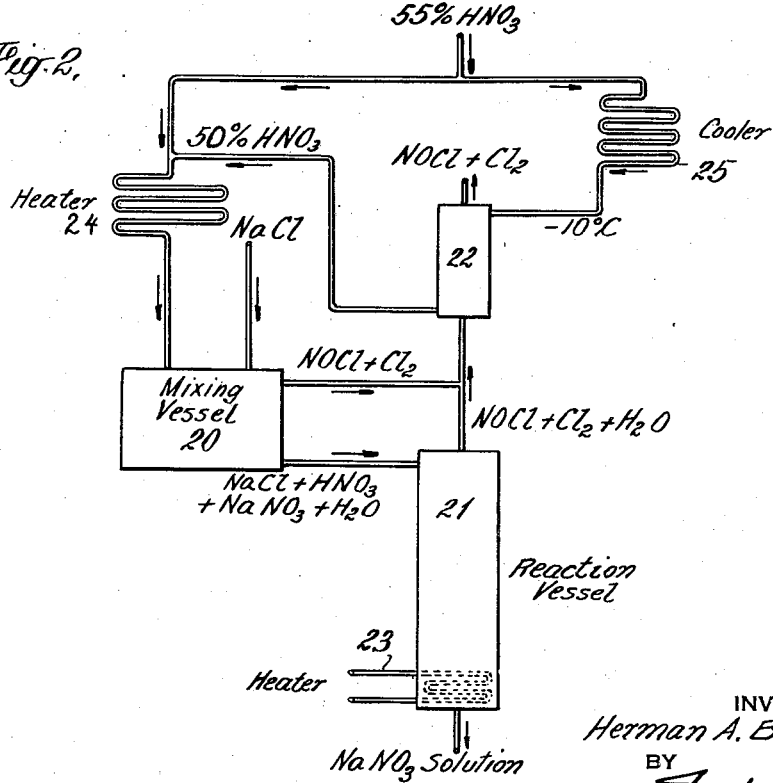
INVENTOR
Herman A. Beekhuis, Jr,
BY
ATTORNEY Patented Nov. 28, 1939

2,181,559

UNITED STATES PATENT OFFICE 2,181,559

PROCESS FOR PRODUCING A NITRATE

Herman A. Beekhuis, Jr., Petersburg, Va., assignor to The Solvay Process Company, New York, N. Y., a corporation of New York Application May 18, 1937, Serial No. 143,245

2 Claims. (Cl. 23—102)

This invention relates to a process for the production of a nitrate by reaction of nitric acid and a metal chloride, for example an alkali metal chloride such as sodium or potassium chloride or an alkali earth metal chloride such as calcium chloride.

It is known that a metal chloride may be heated with nitric acid to form the corresponding nitrate. If a concentrated acid is used at an elevated temperature, nitrosyl chloride and chlorine are formed in addition to the nitrate.

In forming sodium nitrate, for example, by reaction of sodium chloride and nitric acid, it is especially important to obtain a complete decomposition of the chloride so that when the nitrate solution is evaporated to crystallize the salt it will be obtained with but little sodium chloride in the product. It is known to use a large excess of nitric acid for the decomposition of the sodium chloride. The more excess nitric acid which is employed for treating the chloride, however, the greater is the quantity of mother liquor from the nitrate crystallization step which must be reprocessed, as for example, by adding to it sodium chloride to obtain further decomposition of the nitric acid.

It is pointed out in U. S. Patent 1,036,611 of August 27, 1912, that when sodium chloride is heated with an excess of 36% to 37% nitric acid a considerable proportion of the salt remains undecomposed. With more dilute acids, however, it is said a somewhat greater decomposition of the chloride may be obtained. The process of that patent, therefore, endeavors to increase the proportion of salt which is decomposed by using a dilute nitric acid. It is apparent that in order to recover the nitrate product as the solid salt, it is necessary to evaporate all of the water which enters the process with the nitric acid. Accordingly, the use of dilute acid as proposed in the above U. S. Patent 1,036,611 results in large evaporation costs to recover the nitrate. Further, with the dilute acid being used, instead of the reaction going to form nitrosyl chloride and chlorine, the chlorine is evolved principally in the form of hydrochloric acid.

It is an object of this invention to provide a process for producing a nitrate from nitric acid and a metal chloride by which a reaction mixture of these materials may be treated to substantially completely decompose the chloride and yield a nitrate solution containing but a small percentage of unreacted chloride and gaseous nitrosyl chloride and chlorine. It is a further object of the invention to provide a process whereby a metal chloride may be substantially completely decomposed by a limited excess of nitric acid so that, if desired, the residual free acid remaining in the resulting nitrate solution may be neutralized and the neutralized solution evaporated to recover the nitrate or, if it is desired to conserve the residual free nitric acid for reprocessing to decompose additional chloride, the amount of acid which must be reprocessed is relatively small.

In carrying out the process of this invention a reaction mixture of nitric acid and metal chloride is prepared and heated to cause substantially complete reaction of the acid and chloride with the formation of metal nitrate and nitrosyl chloride and chlorine which are evolved from the reaction mixture. In making up the reaction mixture, nitric acid and water are introduced in the proportions of 55 parts or more of $HNO_3$ to every 45 parts of water. This corresponds to the introduction of an aqueous nitric acid containing 55% or more $HNO_3$.

An amount of nitric acid corresponding to about $4.5HNO_3$ to $3MeCl$ to about $8HNO_3$ to $3MeCl$ is used. In these expressions the term "$HNO_3$" represents an amount of nitric acid equivalent to one mol weight of $HNO_3$ and the term "MeCl" represents an amount of metal chloride equivalent to one atomic weight of Cl; i. e., 1 mol weight of a chloride of a monovalent metal, ½ mol weight of a chloride of a divalent metal, etc.

The reaction mixture of nitric acid and metal chloride prepared as described in the preceding paragraph is heated and treated with steam to facilitate the evolution of gaseous nitrosyl chloride and chlorine. The heating of the reaction mixture may be carried out in stages characterized by the different temperatures in the successive stages with the temperature in the final stage being the boiling point of the reaction mixture in that stage. Since water and nitric acid are the liquid constituents of the reaction mixture in which the metal chloride and reaction products of the chloride and nitric acid (metal nitrate, nitrosyl chloride and chlorine) are dissolved, the "boiling point" of the reaction mixture is that temperature at which the sum of the partial pressures of $H_2O$ and $HNO_3$ of the reaction mixture is at least substantially equal to the total gas pressure on the reaction mixture. The treatment of the reaction mixture at its boiling point with steam may be accomplished, for example, by a prolonged boiling of the reaction mixture itself. Or the nitrate solution formed by reaction of the acid and chloride may be boiled and the steam generated passed in direct contact with the reaction mixture at its boiling point. This treatment with steam serves to strip from the hot reaction mixture nitrosyl chloride and chlorine formed by reaction of the nitric acid and metal chloride.

The steam and gases leaving contact with the reaction mixture at its boiling point are then cooled by direct contact with an aqueous liquid containing nitric acid until they are at a temperature below the boiling point of the aqueous liquid with which they are contacted. The steam accompanying the gases leaving the reaction mixture at its boiling point is largely condensed in the aqueous nitric acid solution. The nitrosyl chloride and chlorine gas passing out of contact with the aqueous acid solution contains an amount of water vapor substantially corresponding to saturation of the gas in contact with the solution with which the gas last contacts. The concentration of nitric acid in the aqueous liquid used for cooling the gases and vapors is such that after the water condensed from the gases and vapors mixes with the acid liquid, the resulting solution has a nitric acid concentration corresponding to an aqueous nitric acid containing 30% or more, preferably 40% or more, $HNO_3$.

The desired concentration of nitric acid in the aqueous liquid contacted with the gases to cool them may be maintained by passing all or a part of the nitric acid which is to be used for making up the reaction mixture in direct contact with the gases after cooling the acid. Reaction mixture itself may serve as the acid liquor used for cooling the gases and vapors. Thus, the reaction mixture may be passed continuously through a plurality of stages in which it is heated at increasing temperatures from a temperature below its boiling point up to its boiling point. The thus heated reaction mixture is treated at its boiling point with steam and the steam, together with the gases and vapors evolved from the reaction mixture, is passed in contact with the reaction mixture in at least the preceding stage, and preferably all of the other stages, the steam and evolved gases and vapors passing from one stage into contact with reaction mixture in a preceding stage in which it is heated at a lower temperature.

The heating of the reaction mixture and passage of the evolved gases and vapors in contact with the acid liquid is continued until the metal chloride is substantially completely decomposed (e. g. until the concentration of chloride in the resulting solution of metal nitrate is about 0.5—N or less, and is preferably not above about 0.25—N) and the percentage of free acid (calculated as $HNO_3$) in the resulting nitrate solution is not less than 5 and is also not less than the percentage of water in the solution minus 34, which will hereinafter be written in the mathematical form, (% $H_2O-34$).

By contacting the gas from the reaction mixture at its boiling point with an aqueous nitric acid solution at a temperature below the boiling point of the solution, the amount of water vapor left in the thus cooled nitrosyl chloride-chlorine gas is such that the gas then may be subsequently indirectly cooled to a lower temperature to condense out substantially all of the remaining water vapor and the resulting condensate, containing some nitric and hydrochloric acid, may be returned to the reaction mixture without unduly affecting the completeness of the reaction of the chloride and nitric acid. The entire cooling of the gases to dry them, however, is preferably accomplished by passing the gases in direct contact with cold acid of a concentration corresponding to 30% or stronger, preferably 40% or stronger, nitric acid which, after serving to cool the gases, is introduced into the reaction mixture.

I have discovered that by carrying out the reaction of a metal chloride and nitric acid in accordance with this invention the chloride supplied to the process may be substantially completely decomposed to nitrate; 95% or more of the chloride supplied to the reaction mixture may be converted into nitrate and the resulting nitrate solution may have a chloride content of not over 0.25 normal. This low chloride content in the nitrate solution is of importance in facilitating the use of metallic apparatus for the heating of the solution and permitting the recovery from the solution of commercially pure crystallized nitrate. The substantially complete decomposition of chloride may be accomplished while using a limited excess of nitric acid to chloride.

In its preferred embodiments, this invention comprises preparing a nitric acid containing about 50% or less $HNO_3$ by absorbing nitrogen oxides in water from a gas containing the oxides diluted with other gases. Such gas may be obtained, for example, by oxidizing ammonia with air. The nitric acid thus obtained is concentrated until it contains 55% or more $HNO_3$ and is then introduced into the system where it is reacted with the metal chloride. The concentrating of the acid may be accomplished by boiling it to evaporate water or by reacting nitrogen dioxide with the relatively dilute acid by treating the acid with a concentrated gas containing the same. Both of these procedures may be employed for concentrating the dilute acid. For example, the acid may first be boiled to distill off water and then nitrogen dioxide may be reacted with the thus partially concentrated acid. Also a part of the dilute acid may be concentrated to the desired degree by evaporation of water and another part of the dilute acid may be reacted with concentrated nitrogen dioxide gas.

Among the preferred procedures, one which is particularly advantageous involves the utilization of nitrogen oxide recovered from the evolved nitrosyl chloride to enrich the nitric acid supplied for the reaction. In operating in accordance with this aspect of the invention, nitric acid, water and a metal chloride are continuously supplied to an aqueous reaction mixture of the acid and chloride which is treated as previously described, to form a solution of metal nitrate and evolve gaseous nitrosyl chloride and chlorine. The nitrosyl chloride and chlorine are withdrawn from contact with the nitric acid solution used for cooling the gases, and the nitrosyl chloride is decomposed with the formation of nitrogen oxide. The nitrogen oxide obtained by decomposition of the nitrosyl chloride is reacted with oxygen and with the water prior to its introduction into the reaction mixture, to increase the proportion of $HNO_3$ to water used in making up the reaction mixture. The proportion of nitric acid to water (exclusive of the nitric acid formed by reaction of a part of the water with the nitrogen oxide recovered by decomposition of the nitrosyl chloride) is about 50 parts or more of $HNO_3$ to every 50 parts of $H_2O$, corresponding to supplying to the process 50% aqueous nitric acid. By reacting with a part of this water the nitrogen oxide and oxygen in amount not substantially less than that equivalent to the nitrosyl chloride evolved from the reaction mixture of nitric acid and metal chloride, the proportion of $HNO_3$ to water supplied is increased to about 55 parts of $HNO_3$ or more for every 45 parts of $H_2O$, corresponding to about 55% or stronger aqueous nitric acid.

The invention will be more particularly described by reference to specific procedures for the production of sodium nitrate which are illustrated in the drawing accompanying this specification. In Fig. 1 of the drawing there is shown schematically an apparatus assembly suitable for carrying out one process for the reaction of nitric acid and sodium chloride and recovery of the resulting products in accordance with this invention. In Fig. 2 there is shown an apparatus for carrying out a modification of the procedure illustrated in Fig. 1 for reacting the nitric acid and sodium chloride.

Referring to Fig. 1, the apparatus illustrated therein comprises a reaction vessel 3 and a tower 2 arranged for passage of gases and vapors from the reaction vessel through the tower. An aqueous nitric acid containing 60% $HNO_3$ at a temperature of 30° C. is introduced through a pipe 1 into the top of tower 2 and passes downwardly through the tower over bubble plates therein and overflows from a bottom plate into reaction vessel 3 through a pipe 4. Between its passage over successive pairs of plates in tower 2 the acid solution passes through one of a plurality of coolers 5. Additional aqueous nitric acid containing 60% $HNO_3$ and dry sodium chloride are also introduced directly into reaction vessel 3 through a pipe 6. The reaction mixture in vessel 3 is heated by a heater 7 at the bottom of the vessel to boil it.

The nitric acid and sodium chloride are continuously introduced in the proportions of 200 parts of acid introduced through pipe 1 and 50 parts of acid and 50 parts of sodium chloride introduced through pipe 6. The acid and chloride react in vessel 3 forming nitrosyl chloride and chlorine which are stripped from the reaction mixture by boiling it and pass through tower 2, together with steam boiled from the solution, in contact with the cooled nitric acid descending through the tower. The rate of heating the reaction mixture and the degree of cooling the nitric acid in coolers 5 is so correlated that a temperature of about 60° C. is maintained at the top plate of tower 2 where the nitrosyl chloride and chlorine gas is last contacted with the nitric acid and the nitric acid flowing from the bottom plate of tower 2 into the reaction vessel is heated nearly to its boiling point by the heat of condensation of the steam from the reaction vessel. Under these conditions a nitric acid solution containing about 45% $HNO_3$ and but a low concentration of chloride flows from the bottom plate of tower 2 into reaction vessel 3.

Sodium nitrate solution containing nitric acid is continuously withdrawn from the bottom of vessel 3 through a pipe 8. The withdrawn solution has approximately the following composition:

| | Per cent |
|---|---|
| $HNO_3$ | 29.0 |
| $NaNO_3$ | 28.0 |
| $NaCl$ | 0.5 |
| $H_2O$ | 42.5 |

Since for this solution (% $H_2O-34$) =8.5, the 29.0% nitric acid in the solution is not less than 5% and also is not less than 8.5%.

The solution from vessel 3 is introduced into a neutralizing vessel 9 into which there is also introduced sufficient sodium carbonate in the form of soda ash to neutralize the nitric acid content of the solution. The neutralized solution is passed into an evaporator 10 where it is boiled to crystallize sodium nitrate from the solution. Solution carrying crystallized sodium nitrate passes from evaporator 10 to a filter 11 where the sodium nitrate is recovered and the mother liquor returns to evaporator 10.

Nitrosyl chloride and chlorine formed by reaction of the nitric acid and sodium chloride and water vapor from the boiling reaction mixture, rising through tower 2, are cooled by the acid flowing through this tower and most of the vaporized water is condensed in the acid. The gases drawn from the top of tower 2 contain an amount of water vapor corresponding to saturation at 60° C. in contact with the 60% nitric acid. These gases are passed through a pipe 12 into a decomposition and separation system 13 in which the nitrosyl chloride is decomposed and a concentrated nitrogen oxide gas is recovered separate from the chlorine, both the chlorine originally in the gases from tower 2 as free chlorine and that combined as nitrosyl chloride. This concentrated nitrogen oxide gas, after treatment if necessary to oxidize lower oxides to nitrogen dioxide or to a higher oxide, is passed through pipe 14 into an absorber 15 where it is reacted with a dilute aqueous nitric acid containing about 56% $HNO_3$ supplied to absorber 15 in amount such that the acid is enriched to form 60% nitric acid which flows from the bottom of the absorber to tower 2. The unabsorbed gases leave absorber 15 through pipe 16. If the nitrogen oxide gas from system 13 contains insufficient oxygen for promoting the absorption and conversion of the nitrogen oxides into nitric acid in absorber 15, a desired proportion of oxygen may be introduced from a pipe 17 into the gas passing to the absorber.

Decomposition and separation system 13 may be one adapted for the treatment of a mixture of nitrosyl chloride and chlorine gases by any of numerous procedures. For example, this system may comprise means for oxidizing the nitrosyl chloride by oxygen and means for separating the mixture of chlorine and nitrogen dioxide thus obtained. In such a system the nitrosyl chloride and chlorine gas after being mixed with oxygen may be heated and passed in contact with a catalyst promoting the oxidation of the nitrosyl chloride to $NO_2$ and $Cl_2$. After oxidation of the nitrosyl chloride the nitrogen dioxide and chlorine may be separated from each other by liquefaction and fractional distillation of the mixture of liquefied nitrogen dioxide and chlorine to vaporize the chlorine. The pure liquefied nitrogen dioxide may then be passed together with oxygen into absorber 15 or the liquefied nitrogen dioxide may be first vaporized and the gaseous nitrogen dioxide introduced into the absorber.

Instead of catalytically oxidizing the nitrosyl chloride, it may be treated with hot concentrated nitric acid whereby the nitrosyl chloride is oxidized to nitrogen dioxide and chlorine, following which the two gases may be separated by liquefaction and distillation. The separation of the mixture of nitrogen dioxide and chlorine may be carried out by treating the gas with a solvent for one or the other constituent. For example, the gas mixture may be passed in contact with cooled concentrated nitric acid whereby the nitrogen dioxide is absorbed and separated from the chlorine gas. The absorbed nitrogen dioxide may then be recovered from the nitric acid solution by heating the solution. Concentrated sulfuric acid or a mixture of concentrated sulfuric and nitric acids may similarly be employed for dissolving the nitrogen dioxide from admixture with the chlorine, and the nitrogen dioxide recovered by heating the solution. Since the gases introduced into the system 13 from tower 2 will contain appreciable quantities of water, it is preferred to oxidize the nitrosyl chloride by means of hot concentrated nitric acid. If the nitrosyl chloride is to be catalytically oxidized, it is preferred to dry the gases from tower 2 before introducing them into contact with the catalyst for oxidation of the nitrosyl chloride.

By any of the foregoing methods the nitrosyl chloride may be decomposed and an amount of nitrogen oxides obtained which is substantially equivalent to, or, when the nitrosyl chloride is oxidized by means of nitric acid, is greater than the nitrogen content of the nitrosyl chloride evolved by the reaction of the nitric acid and chloride. Further, the reaction of the dilute nitric acid with nitrogen dioxide in absorber 15 is carried to the point at which there is a substantially complete recovery of the combined nitrogen content of the nitrosyl chloride evolved from reaction vessel 3.

Numerous changes and modifications may be made in the particular procedure described above and illustrated in Fig. 1 of the drawing in addition to those already suggested without departing from the scope of this invention. For example, all of the nitric acid introduced into reaction vessel 3 may be passed through tower 2. This mode of procedure is advantageous in permitting more steam to be vaporized from the reaction mixture and condensed by the cooled nitric acid in tower 2 than when but a portion of the acid is passed into the tower. The degree of cooling of the nitric acid employed for treating the gases and vapors in tower 2 may be varied but it is preferred that the acid at the bottom of this tower, prior to its passage into reaction vessel 3, be at a temperature about 60° C. Instead of cooling the nitric acid passing through tower 2 by means of coolers 5, this cooling step may be omitted, although in so doing less steam may be vaporized in reaction vessel 3 and condensed in tower 2 and the reaction of the chloride and nitric acid in reaction vessel 3 will be less complete. On the other hand, by cooling the nitric acid to a low temperature before introducing it into tower 2, it will serve to condense more steam from vessel 3 than when the acid enters tower 2 at the above temperature of 30° C. and, with such a precooling of the acid, more steam may be boiled from the reaction mixture with an increase in completeness of the reaction.

Mother liquor from which sodium nitrate has been crystallized and separated in evaporator 10 and filter 11 may be returned and introduced into the reaction mixture in vessel 3. Solid sodium nitrate recovered from filter 11 may also be introduced into the reaction mixture. The addition of preformed sodium nitrate to the reaction mixture in the reaction vessel increases the degree of decomposition of the sodium chloride for a given concentration of nitric acid supplied to the reaction mixture and permits of using more dilute nitric acid to obtain the same degree of decomposition of sodium chloride.

In determining the concentration both of the total nitric acid supplied to the reaction mixture and of the nitric acid used for cooling the nitrosyl chloride and chlorine gases in carrying out the process of this invention, three parts by weight of added sodium nitrate are equivalent to one part by weight of $HNO_3$. For example, nitric acid of a concentration of 50% $HNO_3$ with 33 parts of sodium nitrate supplied for every 100 parts of $HNO_3$ and water is equivalent to the use of 55% $HNO_3$ without supplying sodium nitrate to the reaction mixture in addition to that formed by reaction of the acid and chloride. In practicing this invention, therefore, supplying preformed sodium nitrate to the reaction mixture, the proportions of nitric acid, sodium nitrate and water supplied to the reaction mixture are such that the ratio (by weight)

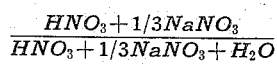

is not less than 0.55 and the concentration of the nitric acid solution contacted with the nitrosyl chloride-chlorine gas evolved from the boiling reaction mixture is such that the ratio (by weight)

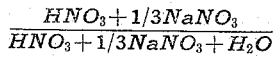

is not less than 0.3 and is preferably not less than 0.4 in the solution after contact with the gas.

Water vapor evolved from the reaction mixture and condensed and returned to the mixture from which it is evolved is not equivalent to water introduced with the nitric acid supplied to the process and is not considered as water supplied to the reaction mixture in determining the proportions of nitric acid and water employed in carrying out this invention. On the other hand, in introducing into the reaction mixture the mother liquor containing sodium nitrate resulting from the treatment of previous portions of mother liquor, the water introduced with this mother liquor as well as the preformed sodium nitrate contained therein, is taken into account in determining the proportions of nitric acid and water supplied to the reaction mixture.

When mother liquor from the nitrate crystallization is returned to the reaction mixture of acid and salt, the neutralization of the free acid in the liquor leaving reaction vessel 3 may be omitted, in which case this acid may be returned in the mother liquor for reaction with salt in vessel 3.

In the above example about 3 parts of $HNO_3$ for every 1 part of NaCl are supplied to the reaction mixture. This ratio may be varied within the range of 1½ to 3 parts of $HNO_3$ for every 1 part of NaCl.

The process of this example may be carried out either as a continuously operating process or as a batch process. For example, in a batch process two reaction vessels and towers may be provided and while the gases and vapors leaving one vessel are being contacted with nitric acid to cool them, the resulting solution may be passed into the second reaction vessel where it forms a part of the reaction mixture to be treated in that vessel.

As a further example of a process embodying this invention, reference is had to Fig. 2 in which there is illustrated a system comprising a mixing vessel 20, a reaction vessel 21, and a gas-liquid contact tower 22. Nitric acid and sodium chloride are mixed in vessel 20 and the mixture introduced into the top of vessel 21. Vessel 21 is a tower containing a series of bubble plates not shown in the drawing. The reaction mixture passes downwardly through the tower over the bubble plates and in the bottom of the tower is boiled by means of a heater 23. The steam evolved from the boiling liquid rises through tower 21 in contact with the descending reaction mixture and serves to heat it and strip from it nitrosyl chloride and chlorine gases which pass from the top of vessel 21 into the bottom of tower 22. In tower 22 the gases and vapors pass upwardly in contact with a descending flow of cool concentrated nitric acid. The nitric acid is drawn from the bottom of tower 22 and after being mixed with additional nitric acid and heated in a heater 24 is mixed with the sodium chloride in mixing vessel 20.

In carrying out the process of this invention in the apparatus of Fig. 2, about 150 parts of aqueous nitric acid containing 55% $HNO_3$ are first cooled in a cooler 25 to about $-10°$ C. and then introduced into the top of tower 22. About 100 parts of additional nitric acid containing 55% $HNO_3$ is introduced into the acid drawn from tower 22 and the mixture of acids is heated in heater 24 to 120° C. before being introduced into mixing vessel 20. About 65 parts of dry sodium chloride are introduced into mixing vessel 20. A partial reaction of the acid and salt takes place in vessel 20 and the nitrosyl chloride and chlorine evolved are introduced into tower 22 together with the gases coming from vessel 21. The heat supplied to boil the solution in the bottom of vessel 21 is regulated so as to maintain the acid solution leaving the bottom of tower 22 at about 70° C. The solution leaving tower 22 at this temperature will contain about 50% $HNO_3$ and a low concentration of chloride.

The sodium nitrate solution formed by reaction of the nitric acid and sodium chloride is drawn from the bottom of vessel 21. This solution has approximately the following composition:

|  | Per cent |
| --- | --- |
| $HNO_3$ | 15.6 |
| $NaNO_3$ | 36.0 |
| $NaCl$ | 0.8 |
| $H_2O$ | 47.6 |

For this solution (% $H_2O-34$) =13.6, and the nitric acid content of the solution, 15.6%, is not less than 5% and also is not less than 13.6%.

It will be understood that in operating the process described above in conjunction with Fig. 2, the nitrosyl chloride-chlorine gas escaping from the top of tower 22 may be treated to oxidize the nitrosyl chloride and nitrogen oxides obtained thereby may be reacted with a dilute aqueous nitric acid to enrich it to form the 55% acid which is passed through cooler 25 and tower 22 and through heater 24 to mixing vessel 20.

As in the case of the process illustrated in Fig. 1, the process of this example may be carried out with all of the nitric acid being introduced through cooler 25 and tower 22, in which case the boiling of the reaction mixture in the bottom of vessel 21 may be prolonged and an even more complete reaction of the sodium chloride obtained. The process of this example may likewise be carried out as a batch procedure although it is less well adapted to batch operation than is that of Fig. 1.

I claim:

1. In a process for the production of a nitrate by heating a reaction mixture of nitric acid, water and metal chloride to its boiling point to cause the acid and chloride to react to form metal nitrate and evolve a moist gaseous mixture substantially consisting of water vapor, nitrosyl chloride and chlorine, the improvement which comprises passing the evolved nitrosyl chloride and chlorine with accompanying water vapor in direct contact with aqueous nitric acid containing 40% or more $HNO_3$, all of which aqueous nitric acid is introduced into contact with said moist gaseous mixture at a temperature of 30° C. or lower, contacting said nitric acid with the moist gaseous mixture without extraneously heating the nitric acid, thereby cooling the gaseous mixture and condensing therefrom most of the water vapor contained therein, withdrawing from contact with said acid a gaseous mixture substantially consisting of nitrosyl chloride and chlorine, then incorporating the resulting nitric acid solution, containing the water condensed from said gases, in a reaction mixture of nitric acid, water and metal chloride which is heated to its boiling point to form additional metal nitrate, nitrosyl chloride and chlorine.

2. In a process for the production of a nitrate by heating a reaction mixture of nitric acid, water and metal chloride at its boiling point to cause the acid and chloride to react to form metal nitrate and evolve a moist gaseous mixture substantially consisting of water vapor, nitrosyl chloride and chlorine, that improvement which comprises continuously supplying said nitric acid, water and metal chloride to said reaction mixture, continuously passing the evolved gas containing nitrosyl chloride, chlorine and water vapor in direct contact and in countercurrent flow with aqueous nitric acid containing 40% or more $HNO_3$, all of which aqueous nitric acid is introduced into contact with said moist gaseous mixture at a temperature of 30° C. or lower, contacting said nitric acid with the moist gaseous mixture without extraneously heating the nitric acid, thereby cooling the gaseous mixture and condensing therefrom most of the water vapor contained therein and heating the aqueous nitric acid by absorption of heat from the gaseous mixture, withdrawing from contact with said acid a gaseous mixture substantially consisting of nitrosyl chloride and chlorine, withdrawing the aqueous nitric acid thus used for cooling the nitrosyl chloride and chlorine gas from contact therewith at a temperature of 60° C. or higher, and then incorporating the resulting nitric acid solution, containing the water condensed from said gases, in said reaction mixture of nitric acid, water and metal chloride which is heated to its boiling point.

HERMAN A. BEEKHUIS, Jr.